March 8, 1938.    J. E. DORAN    2,110,207
SELF LOADING VEHICLE
Filed Nov. 13, 1935    3 Sheets-Sheet 1

INVENTOR
John E. Doran
BY
Emery, Booth, Varney & Whittemore
ATTORNEYS

March 8, 1938.　　　　J. E. DORAN　　　　2,110,207
SELF LOADING VEHICLE
Filed Nov. 13, 1935　　　3 Sheets-Sheet 2

INVENTOR
John E. Doran
BY
Emery, Booth, Varney & Whittemore
ATTORNEYS

March 8, 1938. J. E. DORAN 2,110,207
SELF LOADING VEHICLE
Filed Nov. 13, 1935 3 Sheets-Sheet 3

INVENTOR
John E. Doran
BY
Emery, Booth, Varney & Whittemore
ATTORNEYS

Patented Mar. 8, 1938

2,110,207

UNITED STATES PATENT OFFICE 2,110,207

SELF-LOADING VEHICLE

John E. Doran, Fairfield, Conn.

Application November 13, 1935, Serial No. 49,497

5 Claims. (Cl. 214—83)

This invention relates to self-loading vehicles and has for an object the provision of improvements in this art. More particularly the invention relates to a vehicle loaded from the rear by a screw conveyor, the construction being such that material can be conveniently fed to the conveyor, the body completely filled by the conveyor, and the body can be dumped without interference from the loading mechanism. Other objects and features will be apparent from the following description of an illustrative embodiment of the invention, reference being made to the accompanying drawings wherein.

Figure 1:
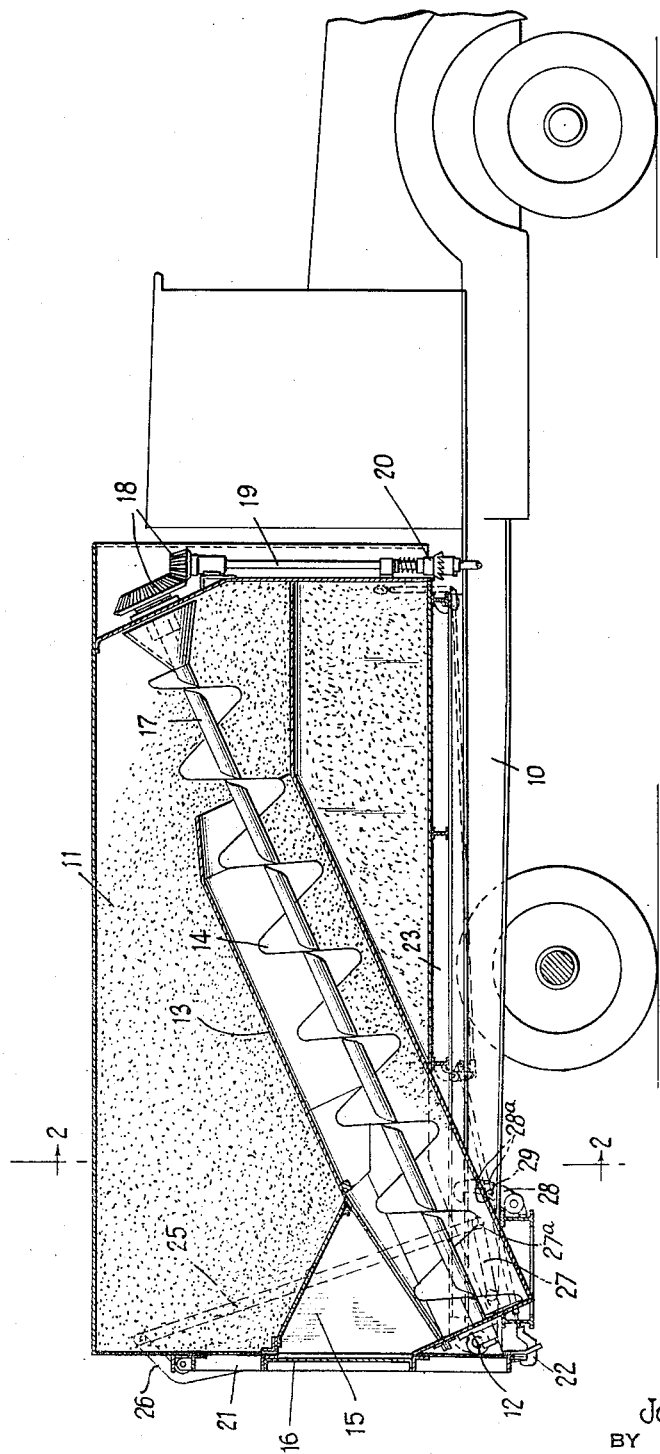
Fig. 1 is a central vertical section of a vehicle embodying the invention.
Figure 2:
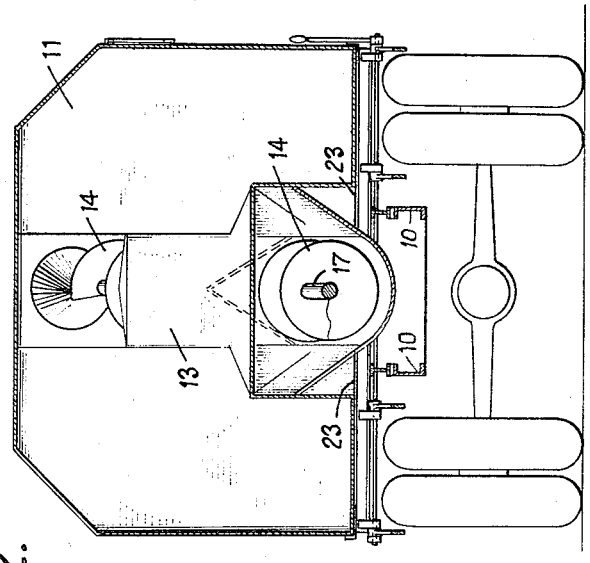
Fig. 2 is a transverse vertical section taken on the line 2—2 of Fig. 1.
Figure 3:
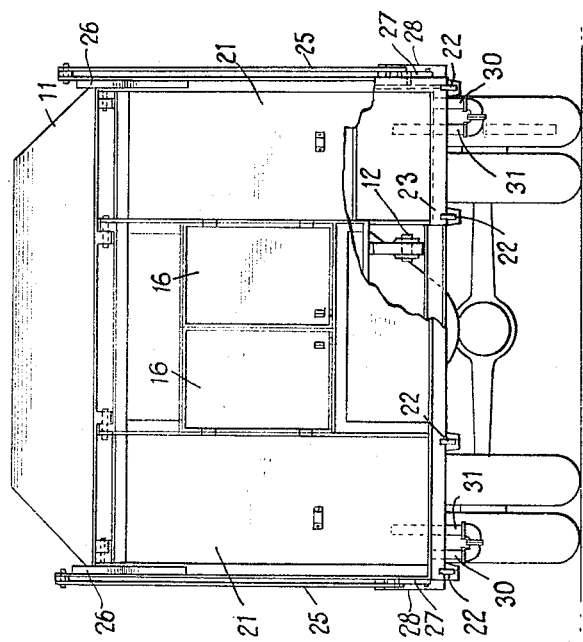
Fig. 3 is a rear end elevation.

Referring to the drawings, a chassis 10 of a motor vehicle provided with controllable power take-off mechanism has mounted thereon a body 11 journalled to tilt about the axis 12 near the rear end thereof. Interiorly the body is provided with a housing 13 for a screw conveyor 14. The housing is inclined upwardly from the rear end of the body and extends to the top portion of the front end of the body. At the rear within the body an inclined hopper 15 which opens to the rear of the body is provided for feeding material to the conveyor. The opening to the hopper is large enough to receive refuse and ash vessels and may be provided with a closure 16 which may be swung outward when the vessels are being emptied into the hopper and kept closed at other times.

The shaft 17 of the conveyor extends to the front end of the body where it is operatively connected by gears 18 with a vertical shaft 19 mounted on the body. At its lower end the shaft 19 is provided with a separable clutch member 20 adapted to engage a mating member (not shown) when the body is in its lower position whereby the loading mechanism on the body may be driven at will from the power take-off mechanism of the vehicle at all times except when the body is raised. Any suitable means may be employed for raising the body through the power take-off mechanism.

The body is provided with a rear door 21 hinged at the top so as to swing open when the body is dumped. The door covers the entire end of the body except around the rear end of the conveyor housing 13 and about the hopper 15. The door may be fastened by latches 22 operated by any suitable manual control mechanism.

Figure 4:
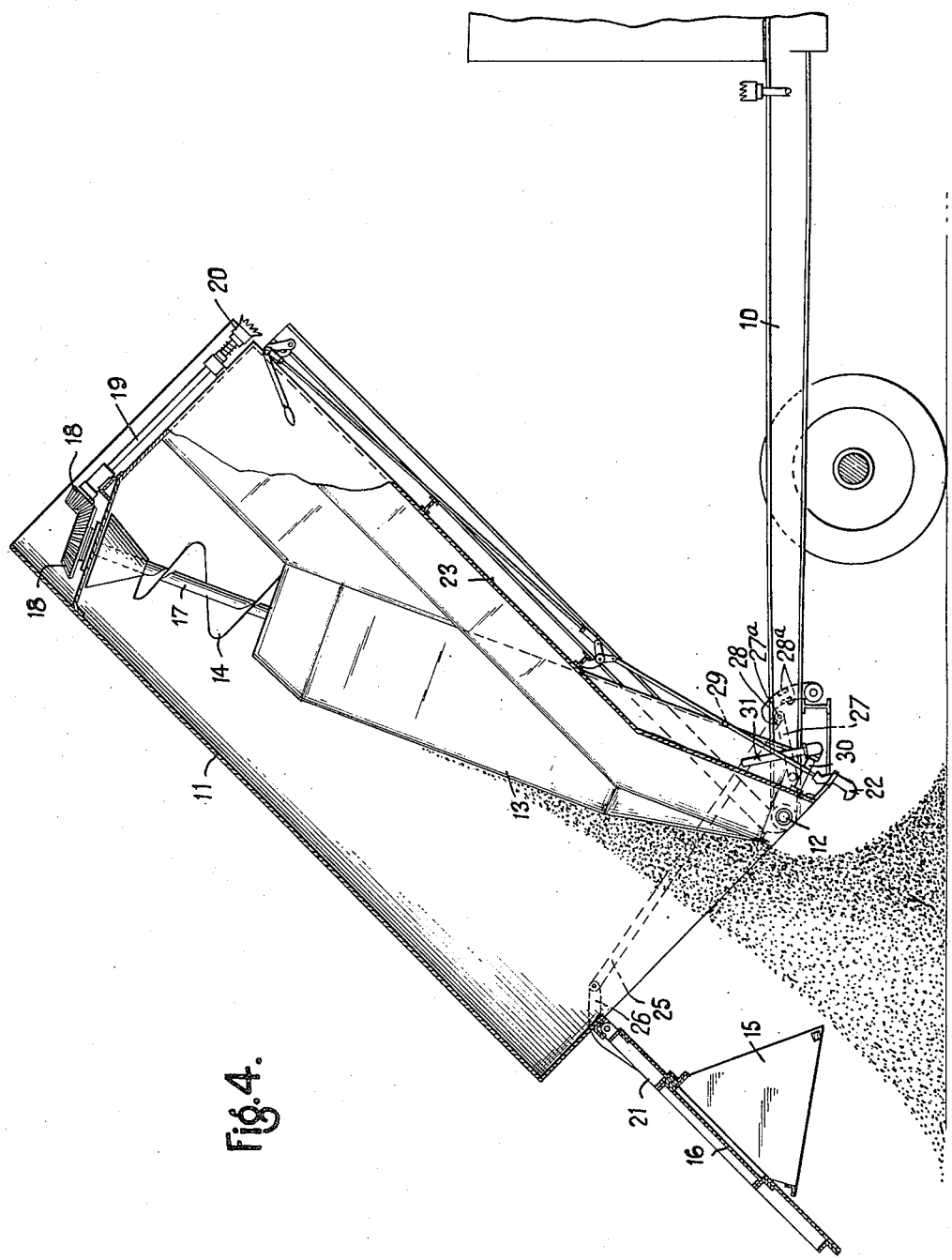
Fig. 4 is a view similar to Fig. 1 with the body in dumping position.

Preferably the rear door 21 carries the hopper 15 or at least the major portion of it and also the closure 16 for the hopper. By this arrangement the hopper is swung out when the door is opened, as shown in Fig. 4, so as to avoid obstructing the outflow of material when dumping. If desired the space beneath the screw conveyor toward the front end of the body may be enclosed so as to prevent material from being loaded there. Then when the body is dumped there will be no material left beneath the conveyor. The body near the bottom will thus in effect be divided into two compartments on each side of the conveyor.

Inasmuch as the screw conveyor carries material to the front end of the body it is necessary to move the material to the rear end if the body is to be fully loaded. This may be accomplished by tilting the body upward while leaving the rear door closed. This will cause the material to move backward by gravity and fill the rear end, after which more material may be loaded in the front end. This procedure may be repeated as often as necessary to secure proper loading, the conveyor always carrying material to the space left vacant until all the space in the body is completely filled.

It is to be noted that the body is pivoted to the chassis at approximately the rear end of and the lowest part of the body inclusive of the rear end of the conveyor housing whereby the body may be dumped from the full height of the pivot without interference from the rear end of the body or the conveyor either with the material dumped or with other obstructions. This avoids the necessity of elevating the rear wheels or moving the truck while dumping. That is, this truck will clear buffers or other obstructions at the dumping site and dump cleanly into a higher pile than similar trucks heretofore proposed. To assist the dumping action the rear end of the body and its frame 23 are bent downward approximately in alignment with the lower portion of the conveyor housing, the body pivot being at the end of the bent portion.

Means are provided for opening the door 21 when it is unlatched and the body is raised. The means herein illustrated comprise rods 25 which are pivoted to arms 26 secured to each side of the door and extending above the hinge line thereof. The rods 25 are pivoted to links 27 which in turn are pivoted to the chassis. Hook latches 28, pivoted to the chassis, are adapted to engage studs or projections 27a at the elbows or pivot axes between the rods 25 and links 27 to hold the rods 25 and cause the door to open when the body is to be dumped. Since the door latches 22 are also operated only when the body is to be dumped, it is convenient to associate the operation of the door opening mechanism with the operation of the door latches. The means herein provided for this purpose comprise pins or studs 29 on the door latch operating rods which are adapted to engage arcuate projections 28a on the hook latches when the body is in its lower position resting on the chassis. Through this connection the hook latches 28 are thrown backward to engage the elbow projections 28a when the door latches are disengaged. As the body is raised the hook latches hold the projections 27a and the lower end of the rod 25 in fixed position and cause the door to be raised in a manner which will be obvious. During the raising of the body the studs 29 on the door latch operating rods, which move up with the body, leave the arcuate projections 28a on the hook latches but return thereto when the body is again lowered. Then when the door latch operating rods are moved forward again to latch the door the hook latches are drawn forward to cause them to disengage the elbow projections 27a. The body is then free to be raised to shift material to the rear during loading without causing the door to be opened.

The material may contain liquid portions so the door is preferably made tight to prevent the liquid from spilling at random and means are provided for draining the liquid only when desired. As shown, pipes 30 are inserted at the bottom and rear end of the body with means to open and close them, the means herein comprising pipes or hose lengths 31 connected to the pipes 30 so as to be raised to confine the liquid or lowered to drain it when desired.

While one embodiment of the invention has been particularly illustrated and described, it is to be understood that the invention may be variously embodied within the limits of the prior art and the scope of the subjoined claims.

I claim:

1. A self-loading vehicle comprising in combination, a dump body, a screw conveyor within the body extending from the bottom upward, a housing for said conveyor including a hopper and a trough all disposed entirely within the body, and a pivot for said body disposed near the bottom and substantially at the rear end of the body.

2. A self-loading vehicle comprising in combination, a body, a screw conveyor, a housing therefor including a hopper and trough all mounted entirely within the body and extending from the lower rear corner at an angle upward toward the upper front corner of the body, and pivot means for the body located approximately at its lower rear end, whereby none of the body or conveyor parts move down sufficiently to interfere with obstructions or with the disposition of material when unloading the body.

3. A self-loading vehicle comprising in combination, a body, a screw conveyor and housing therefor mounted within the body and extending from the lower rear corner at an angle upward toward the upper front corner of the body, the bottom and frame of said body being bent down at the rear end in alignment with the conveyor housing, and pivot means for the body located approximately at its lower rear end whereby none of the body or conveyor parts move down sufficiently to interfere with obstructions or with the disposition of material when unloading the body.

4. A self-loading vehicle comprising in combination, a chassis, a body hinged to the chassis near its lower rear end, a screw conveyor mounted within said body extending from the lower rear end to the upper front end, a rear door hinged at its top to the body, and a hopper carried by said door adapted to direct material to the rear end of said conveyor when the door is closed and to swing up with the door clear of outflowing material when the door is open for dumping.

5. A self-loading vehicle comprising in combination, a chassis, a body hinged to the chassis near its lower rear end, a screw conveyor mounted within said body extending from the lower rear end, to the upper front end, a rear door hinged at its top to the body, and a hopper carried by said door adapted to direct material to the rear end of said conveyor when the door is closed and to swing up with the door clear of outflowing material when the door is opened for dumping, said hopper being carried wholly interiorly of said door and a closure being provided on said door for said hopper lying substantially in the plane of said door when closed.

JOHN E. DORAN.